United States Patent
Buchecker et al.

(10) Patent No.: US 6,831,148 B2
(45) Date of Patent: Dec. 14, 2004

(54) PHOTOACTIVE POLYIMIDES, POLYAMIDE ACIDS OR ESTERS WITH SIDE CHAIN PHOTOCROSSLINKABLE GROUPS

(75) Inventors: Richard Buchecker, Zürich (CH); Guy Marck, Schlierbach (FR); Olivier Muller, Lautenbach (FR)

(73) Assignee: Rolic AG, Zug (CH)

( * ) Notice: Subject to any disclaimer, the term of this patent is extended or adjusted under 35 U.S.C. 154(b) by 156 days.

(21) Appl. No.: 10/181,265
(22) PCT Filed: Jan. 22, 2001
(86) PCT No.: PCT/CH01/00044
§ 371 (c)(1),
(2), (4) Date: Jul. 16, 2002
(87) PCT Pub. No.: WO01/53384
PCT Pub. Date: Jul. 26, 2001

(65) Prior Publication Data
US 2003/0039768 A1 Feb. 27, 2003

(30) Foreign Application Priority Data
Jan. 24, 2000 (GB) .............................................. 0001543
Mar. 6, 2000 (GB) .............................................. 0005383

(51) Int. Cl.[7] ........................ C08G 73/10; C09K 19/00; C08J 3/28; G02F 1/03
(52) U.S. Cl. ...................... 528/310; 528/310; 528/322; 528/335; 528/345; 528/353; 522/149; 522/164; 522/165; 428/1.26; 428/1.27; 428/473.5; 349/183; 349/193
(58) Field of Search ................................. 528/170, 310, 528/322, 335, 345, 353; 522/149, 164, 165; 428/1.26, 1.27, 473.5; 349/183, 193

(56) References Cited
U.S. PATENT DOCUMENTS 6,013,760 A    1/2000  Choi et al.
6,340,506 B1   1/2002  Buchecker et al.

FOREIGN PATENT DOCUMENTS

EP    1 229 066 A1 *  8/2002
WO    WO 99/15576      4/1999
WO    WO 99/60073      11/1999

OTHER PUBLICATIONS

Chigrinov et al., "Physics and applications of LC photo-alignment: recent results," Proceedings of the SPIE, vol. 3318, pp. 454–464 (1997).
Database WPI, Section Ch, Week 199952, Derwent Publications Ltd., London, GB; AN 1999–611008, XP002164624 & WO 99 51662 A (Kanegafuchi Kagaku Kogyo KK), Oct. 14, 1999 abstract.

* cited by examiner

Primary Examiner—P. Hampton Hightower
(74) Attorney, Agent, or Firm—Finnegan, Henderson, Farabow, Garrett & Dunner, L.L.P.

(57) ABSTRACT

A photoactive polymer from the class of polyimides, polyamide acids and esters thereof comprises as a side-chain a photocrosslinkable group of the general formula (I)

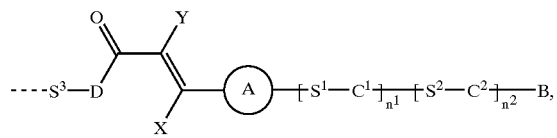

wherein the broken line indicates the point of linkage to the polyimide main chain and wherein: B is a straight-chain or branched alkyl residue which is optionally substituted, wherein one or more non-adjacent $CH_2$ groups may independently be replaced by a group Q; D represents an oxygen atom or $-NR^1-$ wherein $R^1$ represents a hydrogen atom or lower alkyl; and $S^3$ represents a spacer unit. The polymers may be used as orientation layers for liquid crystals and in the construction of unstructured and structured optical elements and multi-layer systems.

33 Claims, No Drawings

PHOTOACTIVE POLYIMIDES, POLYAMIDE ACIDS OR ESTERS WITH SIDE CHAIN PHOTOCROSSLINKABLE GROUPS

This application is a national stage filing under 35 U.S.C. § 371 of international application no. PCT/CH01/00044, filed on Jan. 22, 2001. This application claims the benefit of priority under 35 U.S.C. § 119(a) to GB patent application no. 0001543.8, filed on Jan. 24, 2000, and GB patent application no. 0005383.5, filed on Mar. 6, 2000.

The present invention relates to new photoactive polymers based on polyimides, polyamic acids and esters thereof and their use as orientation layers for liquid crystals and in the construction of unstructured and structured optical elements and multi-layer systems The successful functioning of a Liquid Crystal Device relies upon the ability of the LC molecules within that device to adopt and maintain an alignment imposed upon them. Alignment of the LC molecules is achieved by use of an orientation layer which defines a direction of orientation for the LC molecules of the device with the result that the longitudinal axes of the molecules become aligned with the direction of orientation defined by the orientation layer. In addition to this directional alignment, the orientation layer is also able to impart to the LC molecules an angle of tilt so that the molecules align themselves at an angle to the surface of the orientation layer rather than lying parallel hereto.

Tilt angles of between 1° and 15° are usual for Nematic LCDs. Some electro-optical effects used for liquid crystal displays (LCD) however require alignment layers with very high pretilt angles. Vertically aligned nematic (VAN) LCDs for instance require pretilt angles between 85° and 90°, measured from the surface plane. In the case of hybrid aligned nematic (HAN) LCDs, the pretilt angle at one of the substrates has to be in the above range, whereas the tilt angle at the other substrate is low (typically 0–10°).

Methods of preparing structured and unstructured orientation layers are well known to a skilled person. Customarily used uniaxially rubbed polymer orientation layers such as, for example, polyimides however impact a series of disadvantages like dust generation during rubbing process, destruction of thin film transistors and lack of structuring. The rubbing process consequently does not allow the production of structured layers Orientation layers in which the direction of orientation can be predetermined by irradiation with polarised light have been known for some time. It is by that means possible to avoid the problems inherent in the rubbing process In addition, it is possible to provide areas having different orientation and thus to structure the orientation layer as described for example in *Jpn. J. Appl. Phys.* 31 (1992), 2155–64 (Schadt et al.). In that process the dimerisation of polymer-bonded photoreactive cinnamic acid groups induced by irradiation with linearly polarised light is employed leading to an anisotropic polymer network. Those photo-oriented polymer networks can be used wherever structured or unstructured liquid crystal orientation layers are required. In addition to their use in LCDs, such orientation layers can also be used, for example, in the production of so-called hybrid layers as exemplified in European Patent Applications EP-A-0611981, EP-A-0689084 and EP-A-0753785 (all F. Hoffmann-La Roche A G). Using those hybrid layers of photostructured orientation polymers and crosslinkable low molecular weight liquid crystals it is possible to realise optical elements such as, for example, non-absorptive colour filters, linear and circular polarisers, optical delay layers and so on.

EP-A-0611786 and WO-A-96/10049 (both F. Hoffmann-La Roche A G) as well as EP-A-0763552 (Rolic A G), describe cinnamic acid polymers that are suitable in principle for the synthesis of such anisotropically crosslinked, photostructured orientation layers for liquid crystals. In the case of the compounds described in EP-A-0763552 and WO-A-96/10049, on irradiation with linearly polarised light it is possible, in addition to inducing the desired orientation, simultaneously to induce an angle of tilt. It is thus possible to produce layers having structuring in respect of surface orientation and angle of tilt.

The above photostructured orientation layers have the disadvantage, however, that for certain applications, especially for use in TFT displays, they result in adjacent liquid crystal mixture having an insufficient electrical resistance value. In TFT displays, too low a resistance value of the liquid crystal medium leads to an inadequate "holding ratio", which is a measure of the voltage drop in the display after the voltage has been switched off. Low holding ratio values, however, bring about undesirable changes in brightness and contrast over time and thus result in unstable graduations of the grey tones.

Recently photoreactive materials for orientation layers with improved holding ratios were described in WO-A-99/49360 (Rolic A G), JP-A-10–195296, JP-A-10–232400 (both Samsung Electron Devices Co., Ltd), WO-A-99/15576 (Rolic AG) and WO-A-99/51662 (Kanegafuchi Kagaku Kogyo K K). In WO-A-99/49360, JP-A-10–195296 and JP-A-10–232400 blends of polymeric compounds containing photoreactive polymers on the one hand and polyimides on the other hand are proposed. A disadvantage of such blends is their limited miscibility. Low contents of photoreactive polymers however lead to a loss of orienting properties and consequently to a reduced contrast ratio of liquid crystal layers to be oriented whereas a reduced polyimide content results in insufficient holding ratios. In WO-A-99/15576 and WO-A-99/51662 polyimides incorporating photoreactive cinnamate groups in their side chains are described. WO-A-99/15576 discloses photoactive polymers which contain as side-chains photocrosslinkable groups of the following formula:

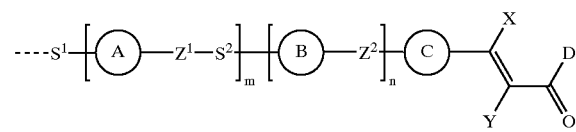

A typical monomer unit is 3,5-diaminobenzoic acid 6-[2-methoxy-4-(2-methoxycarbonylvinyl)phenoxy]hexyl ester:

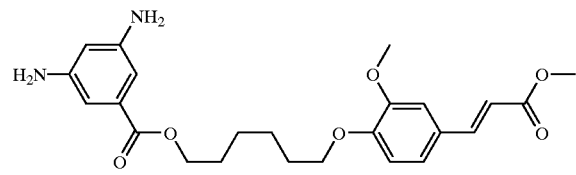

The cinnamic acid derivatives disclosed in WO-A-99/15576 are linked to the polyimide backbone such that the photoreactive groups are pointing away from the backbone.

WO-A-99/51662 discloses photoactive polymers having a cinnamic skeletal structure. A typical monomer disclosed is of the following formula:

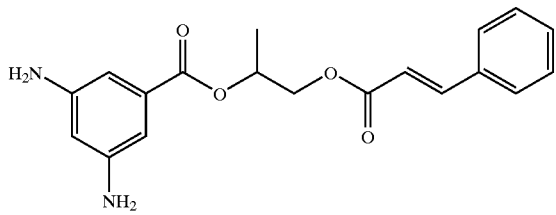

The polyimide compositions are said to combine the photoreactivity and thermal reactivity characteristic of the cinnamic acid skeletal structure. There is no teaching of the improvement of the orientation of liquid crystals.

Consequently stable photoalignable materials for high pretilt angles with sufficiently high holding ratios are not known so far. The problem underlying the invention was, therefore, to find photoreactive polymers that, when irradiated with polarised light, result in the production of stable, high-resolution orientation patterns having very high angle of tilt and at the same time result in sufficiently high holding ratios in the adjacent liquid crystal medium.

Surprisingly, it has now been found that polyimides, incorporating cinnamic acid derivatives in their side chains in such a way, that the cinnamic acid groups are linked to the polyimide backbone via the carboxylic group by means of a flexible spacer, perfectly fulfil the above requirements. The illumination of those compounds, using linearly polarised light, results in excellent orientation of the liquid crystals, in a sufficiently high holding ratio of the liquid crystal medium and simultaneously in an appreciable increase of the tilt angle up to 90°.

A first aspect of the present invention therefore provides photoactive polymers from the class of polyimides polyamide acids and esters thereof, characterised in that they comprise as side-chains photocrosslinkable groups of the general formula I:

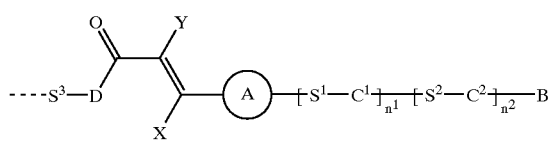

I wherein the broken line indicates the point of linkage to the polyimide main chain and wherein:

A represents pyrimidine-2,5-diyl, pyridine-2,5-diyl, 2,5-thiophenylene, 2,5-furanylene, 1,4- or 2,6-naphthylene, or phenylene; which is optionally substituted by a group selected from fluorine, chlorine, cyano or by a $C_{1-18}$ cyclic, straight-chain or branched alkyl residue, which is optionally substituted by a single cyano group or by one or more halogen atoms and in which one or more non-adjacent alkyl —$CH_2$— groups are optionally replaced by a group Q;

B is a straight-chain or branched alkyl residue which is unsubstituted, mono-substituted by cyano or halogeno, or poly-substituted by halogeno, having 3 to 18 carbon atoms, wherein one or more non-adjacent $CH_2$ groups may independently be replaced by a group Q;

$C^1$ and $C^2$ each independently of the other represents an aromatic or alicyclic group which is unsubstituted or substituted by fluorine, chlorine, cyano, or by a cyclic, straight-chain or branched alkyl residue which is unsubstituted, mono-substituted by cyano or halogeno, or poly-substituted by halogeno, having 1 to 18 carbon atoms and wherein one or more non-adjacent $CH_2$ groups may independently be replaced by a group Q;

D represents an oxygen atom or —$NR^1$— wherein $R^1$ represents a hydrogen atom or lower alkyl;

$S^1$ and $S^2$ each independently of the other represent a single covalent bond or a spacer unit, such as a straight-chain or branched alkylene residue which is unsubstituted, mono-substituted by cyano or halogeno, or poly-substituted by halogeno, having 1 to 24 carbon atoms, wherein one or more non-adjacent $CH_2$ groups may independently be replaced by a group Q;

$S^3$ represents a spacer unit, such as a straight-chain or branched alkylene residue which is unsubstituted, mono-substituted by cyano or halogeno, or poly-substituted by halogeno, having 2 to 24 carbon atoms, wherein one or more non-adjacent $CH_2$ groups may independently be replaced by an aromatic, an alicyclic group or a group Q;

Q represents a group selected from —O—, —CO—, —CO—O—, —O—CO—, —Si($CH_3$)$_2$—O—Si($CH_3$)$_2$—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C— and —O—CO—O—, wherein $R^1$ represents a hydrogen atom or lower alkyl;

$n^1$ and $n^2$ are each independently 0 or 1; and

X, Y each independently of the other represents hydrogen, fluorine, chlorine, cyano, alkyl optionally substituted by fluorine having from 1 to 12 carbon atoms in which optionally one or more non-adjacent $CH_2$ groups are replaced by —O—, —CO—O—, —O—CO— and/or —CH=CH—.

By the term "aromatic" it should be understood to include optionally substituted carbocylic and heterocyclic groups incorporating five, six or ten ring atoms like furan, phenyl, pyridine, pyrimidine, naphthalene, or tetraline units.

By the term "cyclic, straight-chain or branched alkyl group, which is optionally substituted by a single cyano group or by one or more halogen atoms and in which one or more non-adjacent —$CH_2$— groups are optionally replaced by a group Q" it should be understood to include groups selected from the group comprising methyl, ethyl, propyl, isopropyl, butyl, isobutyl, sec-butyl, tert-butyl, pentyl, isopentyl, cyclopentyl, hexyl, cyclohexyl, heptyl, octyl, nonyl, decyl, undecyl, dodecyl, 3-methylpentyl, allyl, but-3-en-1-yl, pent4-en-1-yl, hex-5-en-1-yl, propynyl, butynyl, pentynyl, methoxy, ethoxy, propoxy, isopropoxy, butoxy, isobutoxy, sec-butoxy, tert-butoxy, pentyloxy, isopentyloxy, cyclopentyloxy, hexyloxy, cyclohexyloxy, heptyloxy, octyloxy, nonyloxy, decyloxy, undecyloxy, dodecyloxy, 3-methylpentyloxy, allyloxy, but-3-enyloxy, pent-4-enyloxy, cyclohexylmethoxy, cyclopentylmethoxy, methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, pentyloxycarbonyl, isopentyloxycarbonyl, cyclopentyloxycarbonyl, hexyloxycarbonyl, cyclohexyloxycarbonyl, octyloxycarbonyl, nonyloxycarbonyl, decyloxycarbonyl, undecyloxycarbonyl, dodecyloxycarbonyl, 3-methylpentyloxycarbonyl, allyloxycarbonyl, but-3-enyloxycarbonyl, pent4-enyloxycarbonyl, cylohexylmethoxycarbonyl, cyclopentylmethoxycarbonyl, acetoxy, ethylcarbonyloxy, propylcarbonyloxy, isopropylcarbonyloxy, butylcarbonyloxy, isobutylcarbonyloxy, sec-butylcarbonyloxy, tert-butylcarbonyloxy, pentylcarbonyloxy, isopentylcarbonyloxy, cyclopentylcarbonyloxy, hexylcarbonyloxy, cyclohexylcarbonyloxy, octylcarbonyloxy, nonylcarbonyloxy, decylcarbonyloxy, undecylcarbonyloxy, dodecylcarbonyloxy, 3-methylpentylcarbonyloxy, but-3-enyloxy, pent-4-enyloxy, acetyl, ethylcarbonyl, propylcarbonyl, isopropylcarbonyl, butylcarbonyl, isobutylcarbonyl, sec-butylcarbonyl, pentylcarbonyl, isopentylcarbonyl, cyclohexylcarbonyl, octylcarbonyl, nonylcarbonyl, decylcarbonyl undecylcarbonyl, dodecylcarbonyl, methoxyacetoxy, 1-methoxy-2-propoxy, 3-methoxy-1-propoxy, 2-methoxyethoxy, 2-isopropoxyethoxy, 1-ethoxy-3-pentyloxy, 3-butynyloxy, 4-pentynyloxy, 5-chloropentynyl, 4-pentynecarbonyloxy, 6-propyloxyhexyl, 6-propyloxyhexyloxy, 2-fluoroethyl, trifluoromethyl, 2,2,2-trifluoroethyl, 1H,1H-pentadecafluorooctyl, 1H, 1H,7H-dodecafluoroheptyl, 2-(perfluorooctyl)ethyl, 2-(perfluorobutyl)ethyl, 2-(perfluorohexyl)ethyl, 2-(perfluorodecyl)ethyl, perfluoropropyl, perfluorobutyl, perfluoroheptyl, perfluorooctyl, perfluorononyl, 1-fluoropropoxy, 1-fluoropentyloxy, 2-fluoropropoxy, 2,2-difluoropropoxy, 3-fluoropropoxy, 3,3-difluoropropoxy, 3,3,3-trifluoropropoxy, trifluoromethoxy and the like.

By the term "lower alkyl" it should be understood to include straight chain and branched hydrocarbon radicals having from 1 to 6 carbon atoms, preferably from 1 to 3 carbon atoms. Methyl, ethyl, propyl and isopropyl groups are especially preferred.

By the term "alicyclic" it should be understood to include non-aromatic carbocyclic or heterocyclic ring systems with 3 to 10 carbon atoms like cyclopropane, cyclobutane, cyclopentane, cyclopentene, cyclohexane, cyclohexene, cyclohexadiene and decaline.

It is also preferred that the group A is selected from pyrimidine-2,5-diyl, pyridine-2,5-diyl, 2,5-thiophenylene, 2,5-furanylene, 1,4- or 2,6-naphthylene and a phenylene group, which is optionally substituted by a $C_{1-12}$ cyclic, straight-chain or branched alkyl residue, which alkyl group is optionally substituted by one or more halogen atoms and in which one or more non-adjacent alkyl —$CH_2$— groups are independently optionally replaced by a group selected from —O—, —CO—, —CO—O—, —O—CO—, —CH=CH— and —C≡C—.

It is especially preferred that A is selected from phenylene, which is optionally substituted by a $C_{1-12}$ straight-chain or branched alkyl residue, which alkyl group is substituted by one or more fluorine atoms, and wherein one or more non-adjacent alkyl —$CH_2$— groups are independently optionally replaced by a group selected from —O—, —CO—, —CO—O—, —O—CO— and —CH=CH—.

By the term "phenylene" it should be understood to include 1,2-, 1,3- or 1,4-phenylene, which is optionally substituted. It is preferred that the phenylene group is either a 1,3- or a 1,4-phenylene.

Preferred groups B are selected from straight-chain or branched alkyl residue which is unsubstituted, mono-substituted by cyano or halogeno, or poly-substituted by halogeno, having 3 to 18 carbon atoms, wherein one or more $CH_2$ groups may independently be replaced by —O—, —CO—, —CO—O—, —O—CO—, —CH=CH—, —C≡C—, with the proviso that oxygen atoms are not directly attached to each other.

It is especially preferred that B is selected from straight-chain or branched alkyl residue which is unsubstituted, mono-substituted or poly-substituted by halogeno, having 3 to 12 carbon atoms, wherein one or more $CH_2$ groups may independently be replaced by —O—, —CO—, —CO—O—, —O—CO—, with the proviso that oxygen atoms are not directly attached to each other.

It is preferred that each of the groups $C^1$ and $C^2$ are selected from cyclohexane-1,4-diyl, pyrimidine-2,5-diyl, pyridine-2,5-diyl, 1,4- or 2,6-naphthylene and phenylene, which is optionally substituted by one or more groups selected from fluorine, chlorine, cyano and a $C_{1-12}$ cyclic, straight-chain or branched alkyl residue, which is optionally substituted by a single cyano group or by one or more halogen atoms and in which one or more non-adjacent alkyl —$CH_2$— groups are optionally independently replaced by a group selected from —O—, —CO—, —CO—O—, —O—CO—, —CH=CH—, —C≡C— and —O—CO—O—.

It is especially preferred that the groups $C^1$ and $C^2$ are selected from cyclohexane-1,4-diyl, pyrimidine-2,5-diyl, pyridine-2,5-diyl, 2,6-naphthylene and phenylene, which is optionally substituted by one or more fluorine atoms or a $C_{1-8}$ straight-chain or branched alkyl residue, which is optionally substituted by one or more fluorine atoms, and in which one or more non-adjacent alkyl —$CH_2$— groups are independently optionally replaced by a group selected from —O—, —CO—, —CO—O—, —O—CO— and —CH=CH—.

Preferred groups D are oxygen atom or —NH—.

It is especially preferred that D is an oxygen atom.

It is preferred that the groups $S^1$ and $S^2$ are selected from a single covalent bond, —O—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and a straight-chain or branched alkylene group, in which two or three non-adjacent alkylene —$CH_2$— group are independently optionally replaced by a group Q with the proviso the total number of chain carbon atoms in the alkylene group does not exceed 24, wherein $R^1$ represents a hydrogen atom or lower alkyl.

It is more preferred that $S^1$ and $S^2$ are selected from a single covalent bond, —CO—O—, —O—CO—, —$(CH_2)_r$—, —$(CH_2)_r$—O—, —$(CH_2)_r$—CO—, —$(CH_2)_r$—CO—O—, —$(CH_2)_r$—O—CO—, —$(CH_2)_r$—CO—$NR^1$—, —$(CH_2)_r$—$NR^1$—CO—, —$(CH_2)_r$—$NR^1$—, —O—$(CH_2)_r$—, —CO—O—$(CH_2)_r$—, —O—CO—$(CH_2)_r$—, —$NR_1$—CO—$(CH_2)_r$—, —CO—$NR^1$—$(CH_2)_r$—, —$NR^1$—$(CH_2)_r$—, —O—$(CH_2)_r$—CO—O—, —O—$(CH_2)_r$—O—CO—, —O—$(CH_2)_r$—CO—$NR^1$—, —O—$(CH_2)_r$—$NR^1$—, —O—$(CH_2)_r$—O—, —O—$(CH_2)_r$—$NR^1$—CO—, —$NR^1$—$(CH_2)_r$—CO—O—, —$NR^1$—$(CH_2)_r$—O—, —$NR^1$—$(CH_2)_r$—$NR^1$—, —$NR^1$—$(CH_2)_r$—O—CO—, —CO—$NR^1$—$(CH_2)_r$—O—, —CO—$NR^1$—$(CH_2)_r$—$NR^1$—, —CO—$NR^1$—$(CH_2)_r$—O—CO—, —O—CO—$(CH_2)_r$—CO—, —O—CO—$(CH_2)_r$—O—, —O—CO—$(CH_2)_r$—$NR_2$—, —O—CO—$(CH_2)_r$—CO—O—, —O—CO—$(CH_2)_r$—CO—$NR^1$—, —O—CO—$(CH_2)_r$—$NR^1$—CO—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—$NR^1$—CO—$(CH_2)_s$—, —$(CH_2)_r$—$NR^1$CO—O—$(CH_2)_s$—, —$(CH_2)_r$—O—$(CH_2)_s$—O—, —$(CH_2)_r$—CO—O—$(CH_2)_s$—O—, —$(CH_2)_r$—O—CO—$(CH_2)_s$—O—, —$(CH_2)_r$—$NR^1$—CO—$(CH_2)_s$—O—, —$(CH_2)_r$—$NR^1$—CO—O—$(CH_2)_s$—O—, —O—$(CH_2)_r$—O—$(CH_2)_s$—, —O—$(CH_2)_r$—CO—O—$(CH_2)_s$—, —O—$(CH_2)_r$—$NR^1$—CO—$(CH_2)_s$—, —O—$(CH_2)_r$—$NR^1$—CO—O—$(CH_2)_s$—, —O—$(CH_2)_r$—CO—O—$(CH_2)_s$—O—, —O—$(CH_2)_r$—O—$(CH_2)_s$—O—, —O—$(CH_2)_r$—$NR^1$—CO—$(CH_2)_s$—O—, —O—$(CH_2)_r$—$NR^1$—CO—O—$(CH_2)_s$—O—, —CO—O—$(CH_2)_r$—O—$(CH_2)_s$— and —CO—O—$(CH_2)_r$—O—$(CH_2)_s$—O—, wherein $R_1$ is as defined above, r and s each represent an integer from 1 to 20, preferably from 1 to 12, and r+s≦21, preferably ≦15.

By the terms —(CH$_2$)$_r$— and —(CH$_2$)$_s$— it should be understood to include straight-chain or branched alkylene groupings containing r or s carbon atoms respectively.

It is especially preferred that S$^1$ and S$^2$ are selected from a single covalent bond, —(CH$_2$)$_r$—, —(CH$_2$)$_r$—O—, —(CH$_2$)$_r$—CO—O—, —(CH$_2$)$_r$—O—CO—, —(CH$_2$)$_r$—CO—NH—, —(CH$_2$)$_r$—NH—CO—, —O—(CH$_2$)$_r$—, —CO—O—(CH$_2$)$_r$—, —CO—NH—(CH$_2$)$_r$—, —NH—CO—(CH$_2$)$_r$—, —O—CO—(CH$_2$)$_r$—, —O—CO—(CH$_2$)$_r$—CO—O—, —O—(CH$_2$)$_r$—O—CO—, —O—(CH$_2$)$_r$—CO—NH—, —O—(CH$_2$)$_r$—NH—CO—, —CO—O—(CH$_2$)$_r$—O—, —CO—NH—(CH$_2$)$_r$—O—, —O—(CH$_2$)$_r$—O—, —(CH$_2$)$_r$—NH—CO—(CH$_2$)$_s$—, —(CH$_2$)$_r$—NH—CO—O—(CH$_2$)$_s$—, —(CH$_2$)$_r$—O—(CH$_2$)$_s$—O—, —(CH$_2$)$_r$—NH—CO—(CH$_2$)$_s$—O—, —(CH$_2$)$_r$—NH—CO—(CH$_2$)$_s$—O—, —O—(CH$_2$)$_r$—NH—CO—(CH$_2$)$_s$—, —O—(CH$_2$)$_r$—O—(CH$_2$)$_s$—O—, —O—CO—(CH$_2$)$_r$—O—(CH$_2$)$_s$—O—, —CO—O—(CH$_2$)$_r$—O—(CH$_2$)$_s$—O—, —O—(CH$_2$)$_r$—NH—CO—(CH$_2$)$_s$—O— and —O—CO—(CH$_2$)$_r$—NH—CO—(CH$_2$)$_s$—O—, wherein r and s each represent an integer from 1 to 12 and r+s≦15.

Examples of preferred groups S$^1$ and S$^2$ include 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, methyleneoxy, 2-ethyleneoxy, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 1-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy and the like.

It is preferred that the group S$^3$ is selected from a spacer unit, such as a straight-chain or branched alkylene residue having 5 to 24 carbon atoms, wherein one or more non-adjacent CH$_2$ groups may independently be replaced by a group Q. More preferably the group S$^3$ has 6 to 24 carbon atoms, and especially 7 to 20 carbon atoms, wherein one or more non-adjacent CH$_2$ groups may independently be replaced by a group Q. Note that, when the polyimide main chain includes an aromatic ring linking the polymerisable groups, the ring is to be regarded as part of the main chain and not to be regarded as part of the spacer.

It is more preferred that S$^3$ is selected from —(CH$_2$)$_{r-1}$—, —O—(CH$_2$)$_r$—, —CO—O—(CH$_2$)$_r$—, —O—CO—(CH$_2$)$_r$—, —NR$^1$—CO—(CH$_2$)$_r$—, —CO—NR$^1$—(CH$_2$)$_r$—, —NR$^1$—(CH$_2$)$_r$—, —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—NR$^1$—CO—(CH$_2$)$_s$—, —(CH$_2$)$_r$—NR$^1$—CO—O—(CH$_2$)$_s$—, —O—(CH$_2$)$_r$—O—(CH$_2$)$_s$—, —O—(CH$_2$)$_r$—CO—O—(CH$_2$)$_s$—, —O—(CH$_2$)$_r$—NR$^1$—CO—(CH$_2$)$_s$—, —O—(CH$_2$)$_r$—NR$^1$—CO—(CH$_2$)$_s$— and —CO—O—(CH$_2$)$_r$—O—(CH$_2$)$_s$—, wherein R$^1$ is as defined above, r and s each represent an integer from 1 to 20, preferably from 2 to 12, and r+s<21, preferably <15.

Examples of preferred group S$^3$ are 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 2-oxyethylene, 3-oxypropylene, 4-oxybutylene, 5-oxypentylene, 6-oxyhexylene, 7-oxyheptylene, 8-oxyoctylene, 9-oxynonylene, 10-oxydecylene, 11-oxyundecylene, 12-oxydodecylene, 2-(oxycarbonyl)ethylene, 3-(oxycarbonyl)propylene, 4-(oxycarbonyl)butylene, 5-(oxycarbonyl)pentylene, 6-(oxycarbonyl)hexylene, 7-(oxycarbonyl)heptylene, 8-(oxycarbonyl)octylene, 9-(oxycarbonyl)nonylene, 10-(oxycarbonyl)decylene, 11-(oxycarbonyl)undecylene, 12-(oxycarbonyl)dodecylene, 2-(carbonyloxy)ethylene, 3-(carbonyloxy)propylene, 4-(carbonyloxy)butylene, 5-(carbonyloxy)pentylene, 6-(carbonyloxy)hexylene, 7-(carbonyloxy)heptylene, 8-(carbonyloxy)octylene, 9-(carbonyloxy)nonylene, 10-(carbonyloxy)decylene, 11-(carbonyloxy)undecylene, 12-(carbonyloxy)dodecylene, 2-(carbonylimino)ethyiene, 3-(carbonylimino)propylene, 4-(carbonylimino)butylene, 5-(carbonylimino)pentylene, 6-(carbonylimino)hexylene, 7-(carbonylimino)-heptylene, 8-(carbonylimino)octylene, 9-(carbonylimino)nonylene, 10-(carbonylimino)decylene, 11-(carbonylimino)undecylene, 12-(carbonylimino)dodecylene, 2-iminoethylene, 3-iminopropylene, 4-iminobutylene, 5-iminopentylene, 6-iminohexylene, 7-iminoheptylene, 8-iminooctylene, 9-iminononylene, I 0-iminodecylene, 11-iminoundecylene, 12-iminododecylene, 2-iminocarbonylethylene 3-iminocarbonylpropylene, 4-iminocarbonylbutylene, 5-iminocarbonylpentylene. 6-iminocarbonylhexylene, 7-iminocarbonylheptylene, 8-iminocarbonyloctylene, 9-iminocarbonylnonylene, 10-iminocarbonyldecylene, 1-iminocarbonylundecylene, 12-iminocarbonyldodecylene, 2-(2-ethyleneoxy)ethylene, 2-(3-propyleneoxy)ethylene, 6-(4-butyleneoxy)hexylene, 2-(2-ethyleneiminocarbonyl)ethylene, 2-(3-propyleneiminocarbonyl)ethylene, 6-(4-butyleneiminocarbonyl)hexylene, 6-(3-propyleneiminocarbonyloxy)hexylene, 6-(3-propyleneiminocarbonyl)hexylene and the like.

It is preferred that the groups X and Y represent hydrogen.

It is preferred that n$^1$+n$^2$=0 or 1, and especially preferred that n$^1$=n$^2$=0.

Preferred monomer units from which the main chains of the side-chain polymers according to the invention are built up, are the imide groups of the general formulae II, IV and VI and/or the analogous amic acid groups and amic acid ester groups of the general formulae III, V and VII; especially preferred are the groups of the formulae II, III, VI and VII:

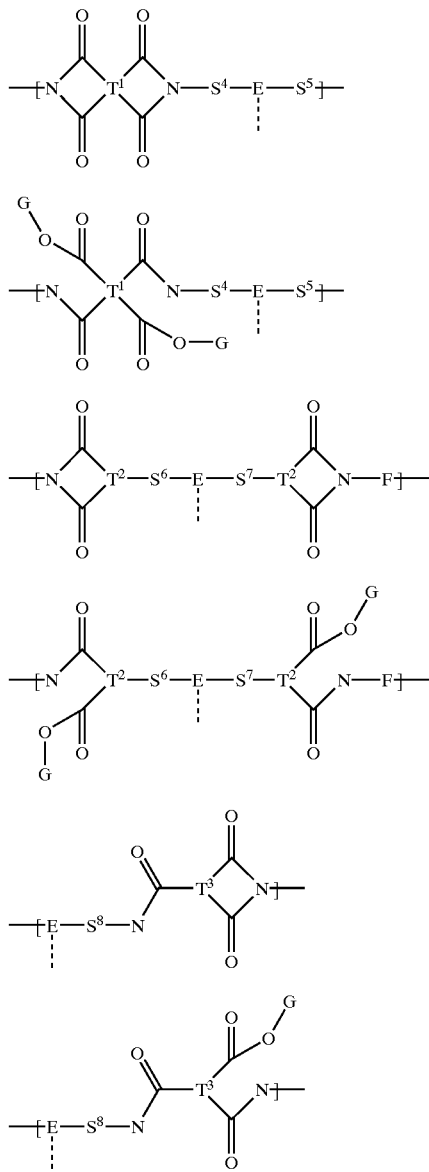

wherein:
the broken line symbolises the linkage to $S^3$
$T^1$ represents a tetravalent organic radical;
$T^2$, $T^3$ each independently represent a trivalent aromatic or alicyclic group which is optionally substituted by a group selected from fluorine, chlorine, cyano and a $C_{1-18}$ cyclic, straight-chain or branched alkyl residue, which is optionally substituted by one or more halogen groups and in which one or more non-adjacent alkyl —$CH_2$— groups are independently optionally replaced by a group selected from —O—, —CO—, —CO—O—, —O—CO—, —CH=CH— and —C—;
$S^4$ to $S^8$ are each independently selected from a single covalent bond and a $C_{1-24}$ straight-chain or branched alkylene residue, which is optionally substituted by a single cyano group or by one or more halogen atoms and in which one or more non-adjacent alkylene —$CH_2$— groups are, independently, optionally replaced by a group Q;
E is selected from the group comprising a nitrogen atom, a group —$CR^1$— and an aromatic or alicyclic divalent, trivalent or tetravalent group, which is optionally substituted by one or more groups selected from fluoro, chloro, cyano and a $C_{1-18}$ cyclic, straight-chain or branched alkyl residue which is optionally substituted by a single cyano group or by one or more halogen atoms and in which one or more non-adjacent —$CH_2$— groups are, independently optionally, replaced by a group selected from —O—, —CO—, —CO—O—, —O—CO—, —CH=CH— and —C—C—, wherein $R^1$ is as defined above;
F represents an aliphatic, alicyclic or aromatic divalent radical; and
G represents a hydrogen atom or a monovalent organic group.

By the term "aliphatic" it should be understood to include saturated and unsaturated, straight-chain and branched alkyl groups, which may be optionally substituted and in which one or more non-adjacent —$CH_2$— groups are replaced by one or more heteroatoms. Optional substituents include alkyl, aryl, cycloalkyl, amino, cyano, epoxy, halogen, hydroxy, nitro and oxo. Examples of heteroatoms that can replace the one or more —$CH_2$— groups include nitrogen, oxygen and sulfur. Replacement nitrogen atoms may be further substituted with groups such as alkyl, aryl and cycloalkyl.

The tetravalent organic radical $T^1$ is preferably derived from an aliphatic, alicyclic or aromatic tetracarboxylic acid dianhydride. Alicyclic or aliphatic tetracarboxylic acid anhydrides are preferably selected from 1,1,4,4-butanetetracarboxylic acid dianhydride, ethylenemaleic acid dianhydride, 1,2,3,4-cyclobutanetetracarboxylic acid cianhydride, 1,2,3,4-cyclopentanetetracarboxylic acid dianhydride, 2,3,5-tricarboxycyclopentylacetic acid dianhydride, 3,5,6-tricarboxynorbornylacetic acid diannydride, 2,3,4,5-tetrahydrofiurantetracarboxylic acid dianhydride, 4-(2, 5-dioxotetrahydrofuran-3-yl) tetrahydronaphthalene-1,2-dicarboxylic acid dianhydride 5-(2,5-dioxotetrahydrofuran-3-yl)-3-methyl-3-cyclo-hexene-1,2-dicarboxylic acid dianhydride, bicyclo[2.2.2] oct-7-ene-2,3,5,6-tetracarboxylic acid dianhydride, bicyclo [2.2.2]octane-2,3,5,6-tetracarboxylic acid dianhydride and 1,8-dimethylbicyclo[2.2.2]oct-7-ene-2,3,5,6-tetracarboxylic acid dianhydride.

Aromatic tetracarboxylic acid dianhydrides are preferably selected from pyromellitic acid dianhydride, 3,3',4,4'-benzophenonetetracarboxylic acid dianhydride, 4,4'-oxydiphthatic acid dianhydride, 3,3',4,4'-diphenylsulfoneteracarboxylic acid dianhydride, 1,4,5,8-naphthalenetetracarboxylic acid dianhydride, 2,3,6,7-naphthalenetetracarboxylic acid dianhydride, 3,3',4,4'-dimethyldiphenylsilanetetracarboxylic acid dianhydride, 3,3',4,4'-tetraphenylsilanetetracarboxylic acid dianhydride, 1,2,3,4-furantetracarboxylic acid dianhydride, 4,4'-bis(3,4-dicarboxyphenoxy)diphenyl sulfide dianhydride, 4,4'-bis(3, 4-dicarboxyphenoxy)diphenyl sulfone dianhydride, 4,4'-bis (3,4-dicarboxyphenoxy)diphenylpropane dianhydride, 3,3', 4,4'-biphenyltetracarboxylic acid dianhydride, ethylene glycol bis(trimellitic acid)dianhydride, 4,4'-(1,4-phenylene) bis(phthalic acid)dianhydride, 4,4'-(1,'3-phenylene)bis (phthalic acid)dianydiride, 4,4'-(hexafluoroisopropylidene) diphthalic acid dianhydride, 4,4'-oxydi(1,4-phenylene)bis (phthalic acid)dianhydride and 4,4'-methylenedi(1,4-phenylene)bis(phthalic acid)dianhydride.

It is especially preferred that the tetracarboxylic acid dianhydrides used to form the tetravalent organic radical $T^1$ are selected from 1,2,3,4-cyclobutanetetracarboxylic acid dianhydride, 1,2,3,4-cyclopentanetetracarboxylic acid dianhydride, 2,3,5-tricarboxycyclopentylacetic acid dianhydride, 5-(2,5-dioxotetrahydrofuran-3-yl)-3-methyl-3-cyclohexene-1,2-dicarboxylic acid dianhydride, 4-(2,5-dioxotetrahydrofuran-3-yl)tetrahydronapthalene-1,2-dicarboxylic acid dianhydride, 4,4'-(hexafluoroisopropylidene)diphthalic acid dianhydride and bicyclo[2.2.2]oct-7-ene-2,3,5,6-tetracarboxylic acid dianhydride.

Each of the groups $T^2$ and $T^3$ can be derived from an aliphatic, alicyclic or aromatic dicarboxylic acid anhydride.

The groups $T^2$ and $T^3$ are preferably trivalent aromatic or alicyclic groups, the three valencies of which are distributed between three different carbon atoms, with the proviso that two of the valencies are located at adjacent carbon atoms. It is especially preferred that the groups $T^2$ and $T^3$ are trivalent benzene derivatives.

The group $S^4$ is preferably selected from a single covalent bond, $-(CH_2)_r-$, $-(CH_2)_r-O-$, $-(CH_2)_r-CO-$, $-(CH_2)_r-CO-O-$, $-(CH_2)_r-O-CO-$, $-(CH_2)_r-CO-NR^1-$, $-(CH_2)_r-NR^1-CO-$, $-(CH_2)_r-NR^1-$, $-(CH_2)_r-O-(CH_2)_s-$, $-(CH_2)_r-CO-O-(CH_2)_s-$, $-(CH_2)_r-O-CO-(CH_2)_s-$, $-(CH_2)_r-NR^1-CO-(CH_2)_s-$, $-(CH_2)_r-NR^1-CO-O-(CH_2)_s-$, $-(CH_2)_r-O-(CH_2)_s-$, $-(CH_2)_r-CO-O-(CH_2)_s-O-$, $-(CH2)_r-O-(CH_2)_s-O-$, $-(CH_2)_r-NR^1-CO-(CH_2)_s-O-$, $-(CH_2)_r-NR^1-CO-O-(CH_2)_r-O-$, $-(CH_2)_r-(CH_2)_s-CO-O-$ and $-(CH_2)_r-O-(CH_2)_s-O-CO-$, wherein $R^1$ is as defined herein above; r and s each represent an integer from 1 to 20, and $r+s \leq 21$. It is more preferred that r and s each represent an integer from 2 to 12. It is especially preferred that $r+s \leq 15$.

Examples of preferred groups $S^4$ include 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy 8-octyleneoxycarbonyl, 7-heptylenecarbonyloxy, 9-nonyleneoxy, 9-nonyleneoxycarbonyl, 8-octylenecarbonyloxy, 1 0-decyleneoxy, 10-decyleneoxycarbonyl, 9-nonylenecarbonyloxy, 11-undecyleneoxy, 1-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneininocarbonyl, 6-hexyleneiminocarbonyl, 7-heptyleneiminocarbonyl, 8-octyleneimnocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexylene, 6-(3-propyleneiminocarbonyl) hexyleneoxy and the like.

The groups $S^5$ and $S^8$ are preferably selected from a single bond, $-(CH_2)_r-$, $-O-(CH_2)_r-$, $-CO-(CH_2)_r-$, $-CO-O-(CH_2)_r-$, $-O-CO-(CH_2)_r-$, $-NR^1-CO-(CH_2)_r-$, $-NR^1-(CH_2)_r-$, $-CO-NR^1-(CH_2)_r-$, $-NR^1-CO-(CH_2)_r-$, $-(CH_2)_r-O-$ $(CH_2)_s-$, $-(CH_2)_r-CO-O-(CH_2)_s-$, $-(CH_2)_r-O-CO-(CH_2)_s-$, $-(CH_2)_r-NR^1-CO-(CH_2)_s-$, $-(CH_2)_r-NR^1CO-O-(CH_2)_s-$, $-O-(CH_2)_r-O-(CH_2)_s-$, $-O-(CH_2)_r-CO-(CH_2)_s-$, $-O-(CH_2)_r-O-CO-(CH_2)_s-$, $-O-(CH_2)_r,NR^1-CO-(CH_2)_s-$, $-O-(CH_2)_r-NR^1-CO-O-(CH_2)_s-$, $-O-CO-(CH_2)_r-O-(CH_2)_s-$ and $-CO-O-(CH_2)_r-O-(CH_2)_s-$, wherein $R^1$ is defined as herein above; r and s each represent an integer from 1 to 20; and $r+s \leq 21$. It is more preferred that r and s each represent an integer from 2 to 12. It is further preferred that $r+s \leq 15$.

Examples of preferred groups $S_5$ and $S_8$ include 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 2-oxyethylene, 3-oxypropylene, 4-oxybutylene, 5-oxypentylene, 6-oxyhexylene, 7-oxyheptylene, 8-oxyoctylene, 9-oxynonylene, 10-oxydecylene, 11-oxyundecylene, 12-oxydodecylene, 2-(oxycarbonyl) ethylene, 3-(oxycarbonyl)propylene, 4-(oxycarbonyl) butylene, 5-(oxycarbonyl)pentylene, 6-(oxycarbonyl) hexylene, 7-(oxycarbonyl)heptylene, 8-(oxycarbonyl) octylene, 9-(oxycarbonyl)nonylene, 10-(oxycarbonyl) decylene, 11-(oxycarbonyl)undecylene, 12-(oxycarbonyl) dodecylene, 2-(carbonyloxy)ethylene, 3-(carbonyloxy) propylene, 4-(carbonyloxy)butylene, 5-(carbonyloxy) pentylene, 6-(carbonyloxy)hexylene, 7-(carbonyloxy) heptylene, 8-(carbonyloxy)octylene, 9-(carbonyloxy) nonylene, 10-(carbonyloxy)decylene, 11-(carbonyloxy) undecylene, 12-(carbonyloxy)dodecylene, 2-(carbonylimino)ethylene, 3-(carbonylimino)propylene, 4-(carbonylimino)butylene, 5-(carbonylimino)pentylene. 6-(carbonylimino)hexylene, 7-(carbonylimino)heptylene, 8-(carbonylimino)octylene, 9-(carbonylimino)nonylene, 10-(carbonylimino)decylene, 11-(carbonylimino)undecylene, 12-(carbonylimino)dodecylene, 2-iminoethylene, 3-iminopropylene, 4-iminobutylene, 5-iminopentylene, 6-iminohexylene, 7-iminoheptylene, 8-iminooctylene, 9-iminononylene, 10-iminodecylene, 11-iminoundecylene, 12-iminododecylene, 2-iminocarbonylethylene, 3-iminocarbonylpropylene, 4-iminocarbonylbutylene, 5-iminocarbonylpentylene, 6-iminocarbonylhexylene, 7-iminocarbonylheptylene, 8-iminocarbonyloctylene, 9-iminocarbonylnonylene, 10-iminocarbonyldecylene, I 1-iminocarbonylundecyiene, 12-iminocarbonyldodecylene, 2-(2-ethyleneoxy)ethylene, 2-(3-propyleneoxy)ethylene, 6-(4-butyleneoxy)hexylene, 2-(2-ethyleneiminocarbonyl) ethylene, 2-(3-propyleneiminocarbonyl)ethylene, 6-(4-butyleneiminocarbonyl)hexylene, 6-(3-propyleneiminocarbonyloxy)hexylene, 6-(3-propyleneiminocarbonyl)hexylene and the like.

The groups $S^6$ and $S^7$ are preferably selected from a single bond, $-(CH_2)_r-$, $-(CH_2)_r-O-$, $-(CH_2)_r-CO-$, $-(CH_2)_r-CO-O-$, $-(CH_2)_r-O-CO-$, $-(CH_2)_r-CO-NR^1-$, $-(CH_2)_r-NR^1-CO-$, $-(CH_2)_r-NR^1-$, $-O-(CH_2)_r-$, $-CO-O-(CH_2)_r-$, $-O-CO-(CH_2)_r-$, $-NR^1-CO-(CH_2)_r-$, $-CO-NR^1-(CH_2)_r-$, $-NR^1(CH_2)_r-$, $-O-(CH_2)_r-CO-O-$, $-O-(CH_2)_r-O-CO-$, $-O-(CH_2)_r-CO-NR^1-$, $-O-(CH_2)_r-NR^1-$, $-O-(CH_2)_r-O-$, $-O-(CH_2)_r-NR^1-CO-$, $-NR^1-(CH_2)_r-CO-O-$, $-NR^1-(CH_2)_r-O-$, $-NR^1-(CH_2)_r-NR^1-$, $-NR^1-(CH_2)_r-O-CO-$, $-CO-NR^1-(CH_2)_r-O-$, $-CO-NR^1-(CH_2)_r-NR^1-$, $-CO-NR^1-(CH_2)_r-$, $O-CO-$, $-O-CO(CH_2)_r-CO-$, $-O-CO-(CH_2)_r-O-$, $-O-CO-(CH_2)_r-NR^1-$, $-O-CO- $(CH_2)_r$—CO—O—, —O—CO—$(CH_2)_r$—CO—NR$^1$—, —O—CO—$(CH_2)_r$—NR$^1$—CO—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—NR$^1$—CO—$(CH_2)_s$—, —$(CH_2)_r$NR$^1$—CO—O—$(CH_2)_s$—, —$(CH_2)_r$—CO—$(CH_2)_s$—O—, —$(CH_2)_r$—CO—O—$(CH_2)_s$—O—, —$(CH_2)_r$—O—CO—$(CH_2)_s$—O—, —$(CH_2)_r$—NR$^1$—CO—$(CH_2)_s$—O—, —$(CH_2)_r$—NR$^1$CO—O—$(CH_2)_s$—O—, —O—$(CH_2)_r$—O—$(CH_2)_s$—, —O—$(CH_2)_r$—CO—O—$(CH_2)_s$—,—O—$(CH_2)_r$—NR$^1$—CO—$(CH_2)_s$—, —O—$(CH_2)_r$—NR$^1$—CO—O—$(CH_2)_s$—, —O—$(CH_2)_r$—CO—O—$(CH_2)_s$—O—, —O—$(CH_2)_r$—O—$(CH_2)_s$—O—, —O—$(CH_2)_r$—NR$^1$—CO—$(CH_2)_s$—O—, —O—$(CH_2)_r$—NR$^1$—CO—O—$(CH_2)_s$—O—, —CO—O—$(CH_2)_r$—O—, —$(CH_2)_s$—, —CO—O—$(CH_2)_r$—O—$(CH_2)_s$—O—, wherein R$^1$ is defined as herein above; r and s each represent an integer from 1 to 20; and r+s≦21. It is more preferred that r and s each represent an integer from 2 to 12. It is especially preferred that r+s≦15.

Examples of preferred groups S$^6$ and S$^7$ include 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decylenelminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexylene, 6-(3-propyleneiminocarbonyl)hexyleneoxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy and the like.

The aliphatic, alicyclic or aromatic divalent radical F is derivable from aliphatic, alicyclic or aromatic diamines by formal removal of the amino groups. Examples of aliphatic or alicyclic diamines from which the radical F can be derived include ethylenediamine, 1,3-propylenediamine, 1,4-butylenediamine, 1,5-pentylenediamine, 1,6-hexylenediamine, 1,7-heptylenediamine, 1,8-octylenediamine, 1,9-nonylenediamine, 1,10-decylenediamine, 1,11-undecylenediamine, 1,12-dodecylenediamine, α,α'-diamino-m-xylene, α,α'-diamino-p-xylene, (5-amino2,2,4-trimethylcyclopentyl)methylamine, 1,2-diaminocyclohexane, 4,4'-diaminodicyclohexylmethane, 1,3-bis(methylamino;cyclohexane and 4,9-dioxadodecane-1,12-diamine.

Examples of aromatic diamines from which the radical F can be derived include 3,5-diaminobenzoic acid methyl ester, 3,5-diaminobenzoic acid hexyl ester, 3,5-diaminobenzoic acid dodecyl ester, 3,5-diaminobenzoic acid isopropyl ester, 4,4'-methylenedianiline, 4,4'-ethylenedianiline, 4,4'-diamino-3,3'-dimethyldiphenylmethane, 3,3', 5,5 '-tetramethylbenzidine, 4,4'-diaminodiphenyl sulfone, 4,4'-diaminodiphenyl ether, 1,5-diaminonaphthalene, 3,3'-dimethyl-4,4'-diaminobiphenyl, 3,4'-diaminodiphenyl ether, 3,3'-diaminobenzophenone, 4,4'-diaminobenzophenone, 4,4'-diamino-2,2'-dimethylbibenzyl, bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 2,7-diaminofluorene, 9,9-bis(4-aminophenyl)fluorene, 4,4'-methylenebis(2-chloroaniline), 4,4'-bis(4-aminophenoxy)biphenyl, 2,2',5,5'-tetra-chloro-4, 4'-diaminobiphenyl, 2,2'-dichloro4,4'-diamino-5,5'-dimethoxybiphenyl, 3,3'-dimethoxy-4,4'-diaminobiphenyl, 4,4'-(1,4-phenyleneisopropylidene)bisaniline, 4,4'-(1,3-phenyleneisopropylidene)bisaniline, 2,2-bis[4-(4-aminophenoxy)phenyl]-propane, 2,2-bis[3-(4-aminophenoxy)phenyl]hexafluoropropane, 2,2-bis[3-amino-4-methylphenyl]hexafluoropropane, 2,2-bis(4-aminophenyl)hexafluoropropane, 2,2'-bis[4-(4-amino-2-trifluoromethylphenoxy)phenyl]hexafluoropropane, 4,4'-diamino-2,2'-bis(trifluoromethyl)biphenyl, and 4,4'-bis[(4-amino-2-trifluoromethyl)-phenoxy]-2,3,5,6,2',3',5',6'-octafluorobiphenyl.

The group E may be divalent, trivalent or tetravalent. When E is divalent, it serves to link the groups S$^4$ and S$^5$, S$^6$ and S$^7$ or S$^8$ and N respectively of the groups III to VII. It will be appreciated that when E is a divalent group, the monomer unit of which it forms a part is not linked to a side chain group of formula (I). When E is a trivalent or a tetravalent group, it serves to link the monomer unit, of which it forms a part, to one or two side chain groups of formula (I) respectively. It is preferred that the photoactive polymer comprises less than 75% of monomer units including a divalent group E, preferably less than 50% and especially less than 30%. Monomer units comprising a trivalent group E are preferred.

The building blocks of the formulae III, V and VII are amic acid groupings or amic acid ester groupings (i.e. carboxamide-carboxylic acid groupings or carboxamide-carboxylic acid ester groupings) which on the one hand may occur as a result of incomplete imidisation in the polyimide chain. On the other hand, polymers that consist only of building blocks of formulae III, V or VII, that is to say polyamic acids or polyamic acid esters, are important precursors for the preparation of the polyimides according to the invention and are also included in the present invention. Of those polymers which contain groups of formulae III, V or VII, preference is given to those in which G is hydrogen, that is to say those which consist exclusively of, or contain some, polyamic acid groups.

The polymers of the invention may be prepared using methods that are known to a person skilled in the art and a second aspect of the invention provides a method of preparing a compound of formula (I) as defined above.

Polyamic acids and polyimides of the present invention may be prepared in accordance with known methods, such as those described in *Plast. Eng.* 36 (1996) (Polyimides, fundamentals and applications).

For example, the polycondensation reaction for the preparation of the polyamic acids is carried out in solution in a polar aprotic organic solvent, such as γ-butyrolactone, N,N-dimethylacetamide, N-methylpyrrolidone or N,N-dimethylformamide. In most cases equimolar amounts of the dianhydride and the diamine are used, that is to say one amino group per anhydride group. If it is desired to stabilise the molecular weight of the polymer, it is possible for that purpose to add an excess or a less-than-stoichiometric amount of one of the two components or to add a monofunctional compound in the form of a dicarboxylic acid monoanhydride or in the form of a monoamine. Examples of such monofunctional compounds are maleic acid anhydride, phthalic acid anhydride, aniline and so on. The reaction is carried out preferably at a temperature of less than 100° C.

The cyclisation of the polyamic acids to form the polyimides can be carried out by heating, that is to say by condensation with removal of water or by other imidisation reactions with reagents. When carried out purely thermally, the imidisation of the polyamic acids is not always complete, that is to say the resulting polyimides may still contain proportions of polyamic acid. The imidisation reactions are generally carried out at a temperature of from 60 to 250° C., but preferably at less than 200° C. In order to achieve imidisation at rather lower temperatures there are additionally mixed into the reaction mixture reagents that facilitate the removal of water. Such reagents are, for example, mixtures consisting of acid anhydrides, such as acetic acid anhydride, propionic acid anhydride, phthalic acid anhydride, trifluoroacetic acid anhydride, and tertiary amines, such as triethylamine, trimethylamine, tributylamine, pyridine, N,N-dimethylaniline, lutidine, collidine etc. The amount of reagents used in that case is preferably at least two equivalents of amine and four equivalents of acid anhydride per equivalent of polyamic acid to be condensed.

The imidisation reaction can be carried out before or alternatively only after application to a support. The latter variant is preferred especially when the polyimide in question has poor solubility in the customary solvents.

The polyamic acids and the polyimides of the present invention have an intrinsic viscosity preferably in range of 0.05 to 10 dL/g, more preferably 0.05 to 5 dL/g. Herein, the intrinsic viscosity ($\eta_{inh}$=ln $\eta_{rel}$/C.) is determined by measuring a solution containing a polymer in a concentration of 0.5 g/100 ml for its viscosity at 30° C. using N-methyl-2-pyrrolidone as solvent.

The polyamic acid chains or polyimide chains of the present invention preferably contain from 2 to 2000 monomer units, especially from 3 to 200.

Additives such as silane-containing compounds and epoxy-containing crosslinking agents may be added to the polymers of the invention in order to improve the adhesion of the polymer to a substrate. Suitable silane-containing compounds are described in *Plast. Eng.* 36 (1996) (Polyimides, fundamentals and applications). Suitable epoxy-containing crosslinking agents include 4,4'-methylenebis(N,N-diglycidylaniline), trimethylolpropane triglycidyl ether, benzene-1,2,4,5-tetracarboxylic acid 1,2:4,5-N,N'-diglycidyldiimide, polyethylene glycol diglycidyl ether, N,N-diglycidylcyclohexylamine and the like.

Further additives such as a photosensitiser, a photoradical generator and/or a cationic photoinitiator may also be added to the polymers of the invention. Suitable photoactive additives include 2,2-dimethoxyphenylethanone, a mixture of diphenylmethanone and N,N-dimethylbenzenamine or ethyl 4-(dimethylamino)benzoate, xanthone, thioxanthone, IRGACURE™ 184, 369, 500, 651 and 907 (Ciba), Michler's ketone, triaryl sulfonium salt and the like.

The polymers according to the invention may be used alone or in combination with other polymers, oligomers, monomers, photoactive polymers, photoactive oligomers and/or photoactive monomers, depending up on the application to which the polymer layer is to be put. It will therefore be appreciated that by varying the composition of the polymer layer it is possible to control properties such as an induced pretilt angle, good surface wetting, high voltage holding ratio, a specific anchoring energy etc.

Polymer layers may be readily prepared from the polymers of the present invention and a third aspect of the invention provides a polymer layer comprising a polymer according to the present invention in a crosslinked form. The polymer layer is preferably prepared by applying one or more polymers according to the invention to a support and, after any imidisation step which may be necessary, crosslinking the polymer or polymer mixture by irradiation with linearly polarised light. It is possible to vary the direction of orientation and the tilt angle within the polymer layer by controlling the direction of irradiation of the linearly polarised light. It will be appreciated that by selectively irradiating specific regions of the polymer layer it is possible to align very specific regions of the layer and provide layers with a defined angle of tilt. This orientation and tilt is retained in the polymer layer by the process of crosslinking.

It will be appreciated that the polymer layers of the present invention can also be used as orientation layers for liquid crystals and a preferred embodiment of the third aspect of the invention provides an orientation layer comprising one or more polymers according to the invention in a crosslinked form. Such orientation layers can be used in the manufacture of optical constructional elements, preferably in the production of hybrid layer elements.

The orientation layers are suitably prepared from a solution of the polymer material. The polymer solution is applied to a support optionally provided with an electrode (for example a glass plate coated with indium-tin oxide (ITO)) by a spin coating process, to produce homogeneous layers of 0.05 to 50 μm thickness. For applying the polymer material, generally different coating techniques may be used like spincoating, miniscuscoating, wirecoating, slotcoating, offsetprinting, flexoprinting, and gravurprinting.

The resulting layer is imidised, if required, and may then be selectively orientated by irradiation with a high-pressure mercury vapour lamp, a xenon lamp or a pulsed UV laser, using a polariser and optionally a mask for creating images of structures. The irradiation time is dependent upon the output of the individual lamps and can vary from a few seconds to several hours. The crosslinking reaction can also be carried out by irradiation using filters that, for example, only allow the radiation suitable for the crosslinking reaction to pass through.

It will be appreciated that the polymer layers of the invention may be used in the production of optical or electro-optical devices having at least one orientation layer as well as unstructured and structured optical elements and multi-layer systems; especially for use in vertical aligned nematic (VAN) LCDs and hybrid aligned nematic (HAN) LCDs.

A further embodiment of the third aspect of the invention provides an optical or electro-optical device comprising one or more polymers according to the first aspect of the invention in crosslinked form. The electro-optical devices may comprise more than one layer. The or each of the orientation layers may contain one or more regions of different spatial orientation.

The polymers in accordance with the invention are illustrated in more detail by the following Examples.

EXAMPLE 1

182.5 mg (0.9306 mmol) of 1,2,3,4-cyclobutantetracarboxylic acid dianhydride was added to a solution of 0.501 g (1.0339 mmol) 3,5-diaminobenzoic acid 6-[3-(3-methoxy-4-butoxyphenyl)acryloyloxy]hexyl ester in 3.5 ml of tetrahydrofuran. Stirring was then carried out at 0° C. for 2 hours. Then another 20.3 mg (0.1035 mmol) of 1,2,3,4-cyclobutantetracarboxylic acid dianhydride were added. The mixture was subsequently allowed to react for 44 hours at room temperature. The polymer mixture was diluted with 3.5 ml THF, precipitated into 200 ml diethyl ether and collected by filtration. The polymer was reprecipitated form THF (10 ml) into 600 ml water to yield, after drying at room temperature under vacuum, 0.61 g of polyamic acid 1 in the from of a beige powder; [η]=0.52 dL/g.

The 3,5-diaminobenzoic acid 6-[3-(3-methoxy-4-butyloxyphenyl)acryloyloxy]hexyl ester used as starting material was prepared in accordance with the following procedure

Preparation of (E)-4-butyloxy-3-methoxycinnamic acid methyl ester

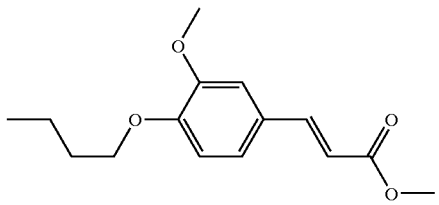

4.16 g (20.0 mmol) ferulic acid methyl ester was dissolved in 115 ml 2-butanone. 2.09 ml (22.0 mmol) η-butyl bromide and 11.06 g (80 mmol) potassium carbonate were added. The reaction suspension was then heated at reflux temperature for 20 hours. The reaction mixture was filtered. The filtrate was concentrated by evaporation. The crude product was recrystallised from 42 ml isopropyl alcohol and yielded 4.85 g (92%) (E)-4-butyloxy-3-methoxycinnamic acid methyl ester as white crystals.

Preparation of (E)-4-butyloxy-3-methoxycinnamic acid

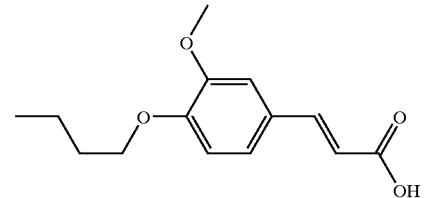

10 g (0.15 mol) potassium hydroxide were dissolved in a mixture of 200 ml methyl alcohol and 5 ml water. 4.85 g (18.35 mmol) (E)-4butyloxy-3-methoxycinnamic acid methyl ester was added. The reaction mixture was subsequently heated to 60° C. After 2.5 h the mixture was concentrated by evaporation. The residue was dissolved in 100 ml cold water and acidified to pH=1 with 13.5 ml hydrochloric acid 37 wt. %. The product was filtered off, washed with water and dried at 50° C. under vacuum to give 4.24 g (92%) (E)-4-butyloxy-3-methoxycinnamic acid as white crystals.

Preparation of (E)-4-butyloxy-3-methoxycinnamic acid 6-hydroxyhexyl ester

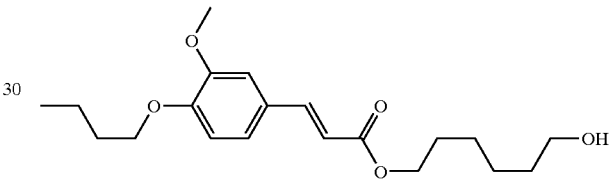

1.38 g (5.50 mmol) (E)-4-butyloxy-3-methoxycinnamic acid was suspended in 3 ml acetonitrile. A mixture of 0.84 g (5.50 mmol) 1,8-diazabicyclo[5 4.0]undec-7-ene(1,5–5) (DBU) and 3 ml acetonitrile was added dropwise over a period of 5 minutes. 0.46 g (1.25 mmol) tetrabutylammonium iodide and 0.68 g (5.00 mmol) 6-chlorohexanol was added and the resulting mixture was then refluxed for 6 hours. The reaction mixture was cooled and then extracted using ethyl acetate and water. The ethyl acetate phase was washed with water, dried over sodium sulfate, filtered and concentrated by rotary evaporation. The residue was purified by chromatography using a silica gel column (120 g) and toluene:ethyl acetate (1:1) as eluant to give 1.39 g (79%) (E)-4-butyloxy-3-methoxycinnamic acid 6-hydroxyhexyl ester as colourless oil.

3,5-Dinitrobenzoic acid 6-[3-(3-methoxy-4-butyloxyphenyl)acryloyloxy]hexyl ester

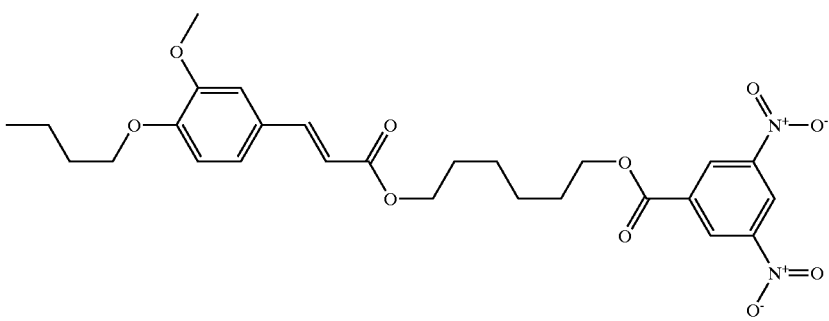

3.00 g (8.56 mmol) (E)-4-butyloxy-3-methoxycinnamic acid 6-hydroxyhexyl ester 2.07 g (8.98 mmol) 3,5-dinitrobenzoyl chloride and 10 mg 4-dimethylaminopyridine were dissolved in 30 ml dichloromethane. The solution was subsequently cooled to 0° C. and then 3.5 ml (43.36 mmol) pyridine was added dropwise, in the course of 20 minutes. After 2.5 hours at 0° C. the reaction mixture was partitioned between dichloromethane and water. The organic phase was washed repeatedly with water, dried over sodium sulfate, filtered and concentrated by rotary evaporation. Chromatography of the residue on 50 g silica gel using toluene: ethyl acetate (9:1) yielded 3.80 g (81%) 3,5-dinitrobenzoic acid 6-[3-(3-methoxy-4-butyloxyphenyl)acryloyloxy]hexyl ester as yellow oil.

3,5-Diaminobenzoic acid 6-[3-(3-methoxy-4-butyloxyphenyl)acryloyloxy]hexyl ester

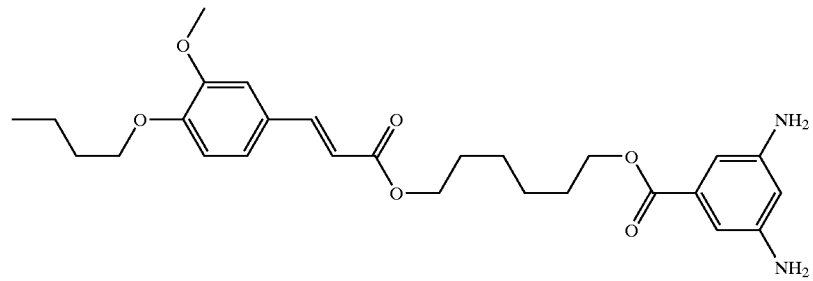

3.80 g (6.98 mmol) 3,5-dinitrobenzoic acid 6-[3-(3-methoxy-4-butyloxyphenyl)acryloyloxy]hexyl ester and 1.47 g (27.48 mmol) of ammonium chloride were suspended in 75 ml of a mixture consisting of methanol:water 9:1. 9.07 g (0.139 mol) of zinc powder was then added in one portions. The reaction temperature rose to 36° C. The suspension was then heated at 40° C. for 1.5 hours. The reaction suspension was partitioned between dichloromethane and water. The resulting suspension was filtered, the organic phase was washed with a saturated sodium bicarbonate solution and repeatedly with water. The organic phase was then dried over sodium sulfate, filtered and concentrated by evaporation to yielded 3.47 g (99%) 3,5-diaminobenzoic acid 6-[3-(3-methoxy-4-butyloxyphenyl) acryloyloxy]hexyl ester as yellow oil

EXAMPLE 2

177.0 mg (0.9025 mmol) of 1,2,3,4-cyclobutantetracarboxylic acid dianhydride was added to a solution of 0.500 g (1.0028 mmol) 3,5-diaminobenzoic acid 6-[3-(3-methoxy-4-pentyloxyphenyl)acryloyloxy]hexyl ester in 3.1 ml of tetrahydrofuran. Stirring was then carried out at 0° C. for 2 hours. Then another 19.7 mg (0.1003 mmol) of 1,2,3,4-cyclobutantetracarboxylic acid dianhydride were added. The mixture was subsequently allowed to react for 21 hours at room temperature. The polymer mixture was diluted with 3.5 ml THF, precipitated into 200 ml diethyl ether and collected. The polymer was reprecipitated form THF (10 ml) into 600 ml water to yield, after drying at room temperature under vacuum, 0.59 g of polyamic acid 2 in the form of a beige powder; [η]=0.52 dL/g.

The 3,5-diaminobenzoic acid 6-[3-(3-methoxy-4-pentyloxyphenyl)acryloyloxy]hexyl ester used as starting material was prepared using the procedure according to Example 1.

EXAMPLE 3

182.1 m (0.9285 mmol) of 1,2,3,4-cyclobutantetracarboxylic acid dianhydride was added to a solution of 0.2572 g (0.5158 mmol) 3,5-diaminobenzoic acid 6-[3-(3-methoxy-4-pentyloxyphenyl)acryloyloxy]hexyl ester and 0.2500 g (0.5159 mmol) 3,5-diaminobenzoic acid 6-[3-(3-methoxy-4-butyloxyphenyl)acryloyloxy]hexyl ester in 3.5 ml of tetrahydrofuran. Stirring was then carried out at 0° C. for 2 hours. Then another 20.2 mg (0.1030 mmol) of 1,2,3,4-cyclobutantetracarboxylic acid dianhydride were added. The mixture was subsequently allowed to react for 22 hours at room temperature. The polymer mixture was diluted with 3.5 ml THF, precipitated into 200 ml diethyl ether and collected. The polymer was reprecipitated form THF (10 ml) into 600 ml water to yield, after drying at room temperature under vacuum, 0.65 g of polyamic acid 3 in the form of a beige powder; [η]=0.52 dL/g.

EXAMPLE 4

148.4 mg (0.7567 mmol) of 1,2,3,4-cyclobutantetracarboxylic acid dianhydride was added to a solution of 500.0 g (0.8406 mmol) 3,5-diaminobenzoic acid 11-[3-(3-methoxy-4-cyclohexylmethoxyphenyl)acryloyloxy]undecyl ester in 3.5 ml of tetrahydrofuran. Stirring was then carried out at 0° C. for 2 hours. 16.5 mg (0.0841 mmol) of 1,2,3,4-cyclobutantetracarboxylic acid dianhydride were added. The mixture was subsequently allowed to react for 21 hours at room temperature. The polymer mixture was diluted with 3.5 ml THF, precipitated into 200 ml diethyl ether and collected. The polymer was reprecipitated form THF, (10 ml) into 600 ml water to yield, after drying at room temperature under vacuum, 0.55 g of polyamic acid 4 in the form of a beige powder; [η]=0.31 dL/g.

EXAMPLE 5

Preparation was carried out analogously to Example 1 using 208.3 mg (0.1.062 mmol) of 1,2,3,4-cyclobutantetracarboxylic acid dianhydride and 480.7 g (1.062 mmol) 3,5-diaminobenzoic acid 6-[3-(4-pentylphenyl)acryloyloxy]hexyl ester to give 0.60 g of polyamic acid 5 in the form of a beige powder; [η]=0.94 dL/g.

EXAMPLE 6

Preparation was carried out analogously to Example 1 using 215.7 mg (0.1.100 mmol) of 1,2,3,4-cyclobutantetracarboxylic acid dianhydride and 480.7 g (1.100 mmol) 3,5-diaminobenzoic acid 6-[3-(4-butyloxyphenyl)acryloyloxy]hexyl ester to give 0.67 g of polyamic acid 6 in the form of a beige powder; [η]=0.86 dL/g.

EXAMPLE 7

Production of an Orientation Layer

A 2% solution of polyamic acid 1 in cyclopentanone was filtered over a 0.2 μm Teflon filter and applied to a glass plate, which had been coated with indium-tin oxide (ITO), in a spin-coating apparatus at 3000 rev./min. in the course of 60 seconds. The resulting film was then predried for 15 minutes at 130° C. and then imidised for 1 hour at 180° C. to form the polyimide.

The glass plate so coated was then irradiated for 4 minutes with the linearly polarised UV light of a 350 W high-pressure mercury vapour lamp. A liquid-crystalline mixture of diacrylates was then applied by spin-coating to the irradiated layer and subsequently crosslinked by isotropic UV light for 30 minutes Under a polarisation microscope, a uniaxially double-refractive layer of oriented liquid crystal molecules was observed. Using a tilt compensator it was ascertained that the direction of orientation agreed with the direction of polarisation of the UV light used for the polyimide layer irradiation.

EXAMPLE 8

Production of an Orientation Layer having a Defined Angle of Tilt

Two glass plates coated with polyamic acid 1 as in Example 7 were irradiated for 4 minutes with linearly polarised UV light, the direction of incidence of the light being inclined by 40° relative to the plate normal. The direction of polarisation of the light was kept in the plane defined by the direction of incidence of the light and the plate normal. From both plates a cell of 20 μm spacing was built such that the illuminated surfaces were facing each other and the previous polarisation directions of illumination were parallel. The cell was then filled with liquid crystal mixture MLC6610 from Merck in the isotropic phase at 105° C. The cell was then gradually cooled to room temperature at a rate ranging from 0.1° C./min to 2° C./min. Between crossed polarisers a uniformly oriented liquid crystal layer was observed. The tilt angle of this parallel cell, by crystal rotation method, was 86°.

EXAMPLE 9

Determination of the Holding Ratio (HR)

Two glass plates coated in accordance with Example 7 were irradiated perpendicularly during 4 minutes with linearly polarised UV light. From both plates a cell of 4 μm spacing was built such that the illuminated surfaces were facing each other and the previous polarisation directions of illumination were parallel. This cell was then maintained at 120° C. under high vacuum for 14 hours and thereafter filled with TFT liquid crystal mixture MLC6610 from Merck, in vacuo at room temperature. Between crossed polarisers a uniformly oriented liquid crystal layer was observed. Prior to testing the holding ratio (HR) the cell was first subjected to ageing for 50 hours at 120° C. The voltage decay V (at T=20 ms) of a voltage surge of 64 μs with $V_0$(V at t=0)=0.2 V was then measured over a period of T=20 ms. The holding ratio then determined, given by HR=$V_{rms}$(t=T)/$V_0$, was 98% at room temperature and 91% at 80° C.

What is claimed is:

1. A photoactive polymer from the class of polyimides, polyamide acids and esters thereof, which comprises as a side-chain a photocrosslinkable group of the general formula I:

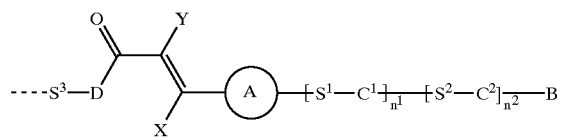

wherein the broken line indicates the point of linkage to the main chain and wherein:

A represents pyrimidine-2,5-diyl, pyridine-2,5-diyl, 2,5-thiophenylene, 2,5-furanylene, 1,4- or 2,6-naphthylene, or phenylene; optionally substituted by a group selected from fluorine, chlorine, and cyano or by a $C_{1-18}$ is cyclic, straight-chain or branched alkyl residue, which is optionally substituted by a single cyano group or by one or more halogen atoms and in which one or more non-adjacent alkyl —$CH_2$— groups are optionally replaced by a group Q;

B is a straight-chain or branched alkyl residue which is unsubstituted, mono-substituted by cyano or halogeno, or poly-substituted by halogeno, having 3 to 18 carbon atoms, wherein one or more non-adjacent $CH_2$ groups may independently be replaced by a group Q;

$C^1$ and $C^2$ each independently of the other represents an aromatic or alicyclic group which is unsubstituted or substituted by fluorine, chlorine, or cyano, or by a cyclic, straight-chain or branched alkyl residue which is unsubstituted, mono-substituted by cyano or halogeno, or poly-substituted by halogeno, having 1 to 18 carbon atoms and wherein one or more non-adjacent $CH_2$ groups may independently be replaced by a group Q;

D represents an oxygen atom or —$NR^1$— wherein $R^1$ represents a hydrogen atom or lower alkyl;

$S^1$ and $S^2$ each independently of the other represent a single covalent bond or a spacer unit;

$S^3$ represents a spacer unit;

Q represents a group selected from —O—, —CO—, —CO—O—, —O—CO—, —Si($CH_3$)$_2$—O—Si($CH_3$)$_2$—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—and —O—CO—O—, wherein $R^1$ represents a hydrogen atom or lower alkyl;

$n^1$ and $n^2$ are each independently 0 or 1; and

X, Y each independently of the other represents hydrogen, fluorine, chlorine, cyano, or alkyl optionally substituted by fluorine having from 1 to 12 carbon atoms in which optionally one or more non-adjacent $CH_2$ groups are replaced by a group selected from —O—, —CO—O—, —O—CO—and —CH=CH—.

2. A polymer as claimed in claim 1 wherein the group A is optionally substituted by a $C_{1-12}$ cyclic, straight-chain or branched alkyl residue, which alkyl group is optionally substituted by one or more halogen atoms and in which one or more non-adjacent alkyl —$CH_2$— groups are independently optionally replaced by a group selected from —O—, —CO—, —CO—O—, —O—CO—, —CH=CH— and —C≡C—.

3. A polymer as claimed in claim 2 wherein the group A comprises phenylene, optionally substituted by a $C_{1-12}$ straight-chain or branched alkyl residue, which alkyl group is substituted by one or more fluorine atoms, and wherein one or more non-adjacent alkyl —CH$_2$— groups are independently optionally replaced by a group selected from —O—, —CO—, —CO—O—, —O—CO— and —CH=CH—.

4. A polymer as claimed in claim 3 wherein the phenylene group comprises a 1,3- or 1,4-phenylene.

5. A polymer as claimed in claim 1 wherein the group B comprises a straight-chain or branched alkyl residue which is unsubstituted, mono-substituted by cyano or halogeno, or poly-substituted by halogeno, having 3 to 18 carbon atoms, wherein one or more CH$_2$ groups may independently be replaced by —O—, —CO—, —CO—O—, —O—CO—, —CH≡CH—, or —C≡C—, with the proviso that oxygen atoms are not directly attached to each other.

6. A polymer as claimed in claim 5 wherein the alkyl residue of group B has 3 to 12 carbon atoms, wherein one or more CH$_2$ groups may independently be replaced by —O—, —CO—, —CO—O—, or —O—CO—, with the proviso that oxygen atoms are not directly attached to each other.

7. A polymer as claimed in claim 1 wherein each of the groups C$^1$ and C$^2$ is selected from cyclohexane-1,4-diyl, pyrimidine-2,5-diyl, pyridine-2,5-diyl, 1,4- or 2,6-naphthylene and phenylene; optionally substituted by one or more groups selected from fluorine, chlorine, cyano and a C$_{1-12}$ cyclic, straight-chain or branched alkyl residue, which is optionally substituted by a single cyano group or by one or more halogen atoms and in which one or more non-adjacent alkyl —CH$_2$—groups are optionally independently replaced by a group selected from —O—, —CO—, —CO—O—, —O—CO—, —CH=CH—, —CH≡CH—and —O—CO—O—.

8. A polymer as claimed in claim 7 wherein the groups C$^1$ and C$^2$ are selected from cyclohexane-1,4-diyl, pyrimidine-2,5-diyl, pyridine-2,5-diyl, 2,6-naphthylene and phenylene; optionally substituted by one or more fluorine atoms or a C$_{1-8}$ straight-chain or branched alkyl residue, which is optionally substituted by one or more fluorine atoms, and in which one or more non-adjacent alkyl —CH$_2$— groups are independently optionally replaced by a group selected from —O—, —CO—, —CO—O—, —O—CO— and —CH=CH—.

9. A polymer as claimed in claim 1 wherein D is an oxygen atom or —NH—.

10. A polymer as claimed in claim 1 wherein the groups S$^1$ and S$^2$ are selected from a single covalent bond, —O—, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH=CH—, —C≡C—, —O—CO—O—and a straight-chain or branched alkylene group, in which two or three non-adjacent alkylene —CH$_2$—groups are independently optionally replaced by a group Q with the proviso the total number of chain carbon atoms in the alkylene group does not exceed 24, wherein R$^1$ represents a hydrogen atom or lower alkyl.

11. A polymer as claimed in claim 10 wherein S$^1$ and S$^2$ are selected from a single covalent bond, —CO—O—, —O—CO—, —(CH$_2$)$_r$—, —(CH$_2$)$_r$—O—, —(CH$_2$)$_r$—CO—, —(CH$_2$)$_r$—CO—O—, —(CH$_2$)$_r$—O—CO—, —(CH$_2$)$_r$—CO—NR$^1$—, —(CH$_2$)$_r$—NR$^1$—CO—, —(CH$_2$)$_r$—NR$^1$—, —O—(CH$_2$)$_r$—, —CO—O—(CH$_2$)$_r$—, —O—CO—(CH$_2$)$_r$—, —NR$^1$—CO—(CH$_2$)$_r$—, —CO—NR$^1$—(CH$_2$)$_r$—, —NR$^1$—(CH$_2$)$_r$—, —O—(CH$_2$)$_r$—CO—O—, —O—(CH$_2$)$_r$—O—CO—, —O—(CH$_2$)$_r$—CO—NR$^1$—, —O—(CH$_2$)$_r$—NR$^1$—CO—, —NR$^1$—(CH$_2$)$_r$—O—, —NR$^1$—(CH$_2$)$_r$—CO—, —NR$^1$—(CH$_2$)$_r$—NR$^1$—, —NR$^1$—(CH$_2$)$_r$—O—CO—, —CO—NR$^1$—(CH$_2$)$_r$—O—, —CO—NR$^1$—(CH$_2$)$_r$—NR$^1$—, —CO—NR$^1$—(CH$_2$)$_r$—O—CO—, —O—CO—(CH$_2$)$_r$—CO—, —O—CO—(CH$_2$)$_r$—CO—O—, —O—CO—(CH$_2$)$_r$—NR$_2$—, —O—CO—(CH$_2$)$_r$—CO—O—, —O—CO—(CH$_2$)$_r$—CO—NR$^1$—, —O—CO—(CH$_2$)$_r$—NR$^1$—CO—, —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—NR$^1$—CO—(CH$_2$)$_s$—, —(CH$_2$)$_r$—NR$^1$CO—O—(CH$_2$)$_s$—, —(CH$_2$)$_r$—O—(CH$_2$)$_s$—O—, —(CH$_2$)$_r$—CO—O—(CH$_2$)$_s$—O—, —(CH$_2$)$_r$—O—CO—(CH$_2$)$_s$—O—, —(CH$_2$)$_r$—NR$^1$—CO—(CH$_2$)$_s$—O—, —(CH$_2$)$_r$—NR$^1$—CO—O—(CH$_2$)$_s$—, —O—(CH$_2$)$_r$—O—(CH$_2$)$_s$—, —O—(CH$_2$)$_r$—CO—O—(CH$_2$)$_s$—, —O—(CH$_2$)$_r$—NR$^1$—CO—(CH$_2$)$_s$—, —O—(CH$_2$)$_r$—NR$^1$—CO—O—(CH$_2$)$_s$—, —O—(CH$_2$)$_r$—CO—O —(CH$_2$)$_s$—O—, —O—(CH$_2$)$_r$—O—(CH$_2$)$_s$—O—, —O—(CH$_2$)$_r$—NR$^1$—CO—(CH$_2$)$_s$—O—, —O—(CH$_2$)$_r$—NR$^1$—CO—(CH$_2$)$_s$—O—, —CO—O—(CH$_2$)$_r$—O—(CH$_2$)$_s$— and —CO—O—(CH$_2$)$_r$—O—(CH$_2$)$_s$—O—, wherein R$^1$ is as defined in claim 10, r and s each represent an integer from 1 to 20.

12. A polymer as claimed in claim 11 wherein S$^1$ and S$^2$ are selected from a single covalent bond, —(CH$_2$)$_r$—, —(CH$_2$)$_r$—O—, —(CH$_2$)$_r$—CO—O—, —(CH$_2$)$_r$—O—CO—, —(CH$_2$)$_r$—CO—NH—, —(CH$_2$)$_r$—NH—CO—, —O—(CH$_2$)$_r$—, —CO—O—(CH$_2$)$_r$—, —CO—NH—(CH$_2$)$_r$—, —NH—CO—(CH$_2$)$_r$—, —O—CO—(CH$_2$)$_r$—, —O—CO—(CH$_2$)$_r$—CO—O—, —O—(CH$_2$)$_r$—CO—, —O(CH$_2$)$_r$—CO—NH—, —O—(CH$_2$)$_r$—NH—CO—, —CO—O—(CH$_2$)$_r$—O—, —CO—NH—(CH$_2$)$_r$—O—, —O—(CH$_2$)$_r$—O—, —(CH$_2$)$_r$—NH—CO—(CH$_2$)$_s$—, —(CH$_2$)$_r$—NH—CO—O—(CH$_2$)$_s$—, —(CH$_2$)$_r$—O—(CH$_2$)$_s$—O—, —(CH$_2$)$_r$—NH—CO—(CH$_2$)$_s$—O—, —(CH$_2$)$_s$—O—, —(CH$_2$)$_r$—NH—CO—O—(CH$_2$)$_s$—O—, —O—(CH$_2$)$_r$—NH—CO—(CH$_2$)$_s$—, —O—(CH$_2$)$_r$—O—(CH$_2$)$_s$—O—, —O—CO—(CH$_2$)$_r$—O—(CH$_2$)$_s$—O—, —CO—O—(CH$_2$)$_r$—O—(CH$_2$)$_s$—O—, —O—(CH$_2$)$_r$—NH—CO—(CH$_2$)$_s$—O— and —O—CO—(CH$_2$)$_r$—NH—CO—(CH$_2$)$_s$—O—, wherein r and s each represent an integer from 1 to 12 and r+s≦15.

13. A polymer as claimed in claim 1 wherein the group S$^3$ comprises a straight-chain or branched alkylene residue which is unsubstituted, mono-substituted by cyano or halogeno, or poly-substituted by halogeno, having 6 to 24 carbon atoms, wherein one or more non-adjacent CH$_2$ groups may independently be replaced by an aromatic group, an alicyclic group or a group Q, wherein Q is as defined in claim 1.

14. A polymer as claimed in any claim 13 wherein S$^3$ is selected from —(CH$_2$)$_{r-1}$—, —O—(CH$_2$)$_r$—, —CO—O—(CH$_2$)$_r$—, —O—CO—(CH$_2$)$_r$—, —NR$^1$—CO—(CH$_2$)$_r$—, —CO—NR$^1$—(CH$_2$)$_r$—, —NR$^1$—(CH$_2$)$_r$—, —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—NR$^1$—CO—(CH$_2$)$_s$—, —(CH$_2$)$_r$—NR$^1$—CO—O—(CH$_2$)$_s$—, —O—(CH$_2$)$_r$—O—(CH$_2$)$_s$—, —O—(CH$_2$)$_r$—CO—O—(CH$_2$)$_s$—, —O—(CH$_2$)$_r$—NR$^1$—CO—(CH$_2$)$_s$—, —O—(CH$_2$)$_r$—NR$^1$—CO—O—(CH$_2$)$_s$— and —CO—O—(CH$_2$)$_r$—O—(CH$_2$)$_s$—, wherein R$^1$ represents a hydrogen atom or lower alkyl, r and s each represent an integer from 1 to 20, and r+s≦21.

15. A polymer as claimed in any preceding claim wherein the groups X and Y represent hydrogen.

16. A polymer as claimed in any preceding claim wherein n$^1$=n$^2$=0.

17. A polymer as claimed in any preceding claim wherein the monomer units from which the main chain comprises imide groups of the general formulae II, IV and VI and/or the analogous amic acid groups and amic acid ester groups of the general formulae III, V and VII:

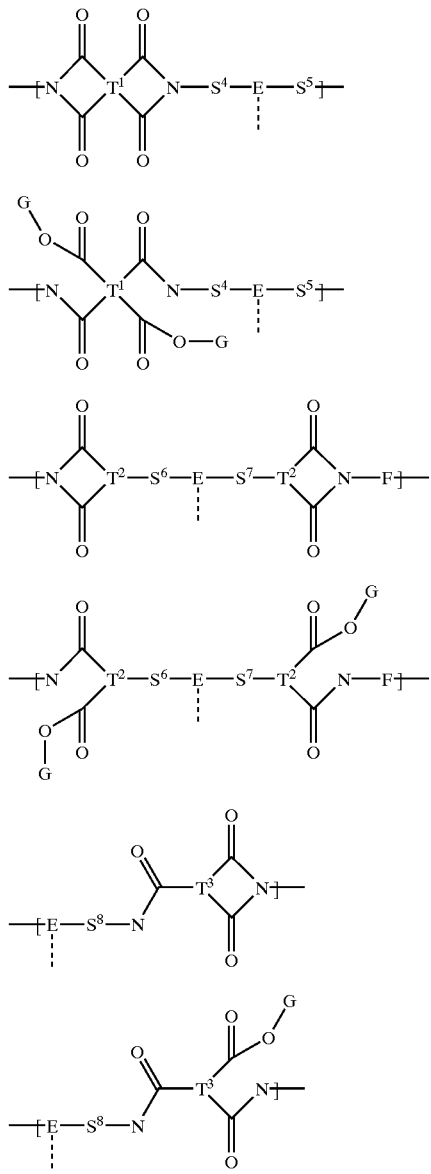

wherein:
the broken line symbolises the linkage to $S^3$;
$T^1$ represents a tetravalent organic radical;
$T^2$, $T^3$ each independently represent a trivalent aromatic or alicyclic group which is optionally substituted by a group selected from fluorine, chlorine, cyano and a $C_{1-8}$ cyclic, straight-chain or branched alkyl residue, which is optionally substituted by one or more halogen groups and in which one or more non-adjacent alkyl —$CH_2$— groups are independently optionally replaced by a group selected from —O—, —CO—, —CO—O—, —O—CO—, —CH=CH— and —C≡C—;
$S^4$ to $S^8$ are each independently selected from a single covalent bond and a $C_{1-24}$ straight-chain or branched alkylene residue, which is optionally substituted by a single cyano group or by one or more halogen atoms and in which one or more non-adjacent alkylene —$CH_2$— groups are, independently, optionally replaced by a group Q;

E is selected from the group comprising a nitrogen atom, a group —$CR^1$— and an aromatic or alicyclic divalent, trivalent or tetravalent group, which is optionally substituted by one or more groups selected from fluoro, chloro, cyano and a $C_{1-18}$ cyclic, straight-chain or branched alkyl residue which is optionally substituted by a single cyano group or by one or more halogen atoms and in which one or more non-adjacent —$CH_2$— groups are, independently, optionally, replaced by a group selected from —O—, —CO—, —CO—O—, —O—CO—, —CH=CH— and —C≡C—, wherein $R^1$ represents a hydrogen atom or lower alkyl;

F represents an aliphatic, alicyclic or aromatic divalent radical; and

G represents a hydrogen atom or a monovalent organic group.

18. A polymer as claimed in claim 17 wherein the tetravalent organic radical $T^1$ is derived from an aliphatic, alicyclic or aromatic tetracarboxylic acid dianhydride.

19. A polymer as claimed in claim 17 wherein one or more of the groups $T^2$ and $T^3$ is derived from an aliphatic, alicyclic or aromatic dicarboxylic acid anhydride.

20. A polymer as claimed in any one of claim 17 wherein the group $S^4$ is selected from a single covalent bond, —($CH_2$)$_r$—, —($CH_2$)$_r$—O—, —($CH_2$)$_r$—CO—, —($CH_2$)$_r$—CO—O—, —($CH_2$)$_r$—O—CO—, —($CH_2$)$_r$—CO—$NR^1$—, —($CH_2$)$_r$—$NR^1$—CO—, —($CH_2$)$_r$—$NR^1$—, —($CH_2$)$_r$—O—($CH_2$)$_s$—, —($CH_2$)$_r$—CO—O—($CH_2$)$_s$—, —($CH_2$)$_r$—O—CO—($CH_2$)$_s$—, —($CH_2$)$_r$—$NR^1$—CO—($CH_2$)$_s$—, —($CH_2$)$_r$—$NR^1$—CO—O—($CH_2$)$_s$—, —($CH_2$)$_r$—O—($CH_2$)$_s$—O—, —($CH_2$)$_r$—CO—O—($CH_2$)$_s$—O—, —($CH_2$)$_r$—O—CO—($CH_2$)$_s$—O—, —($CH_2$)$_r$—$NR^1$—CO—($CH_2$)$_s$—O—, —($CH_2$)$_r$—$NR^1$—CO—O—($CH_2$)$_s$—O—, —($CH_2$)$_r$—O—($CH_2$)$_s$—CO—O— and —($CH_2$)$_r$—O—($CH_2$)$_s$—O—CO—, wherein $R^1$ represents a hydrogen atom or lower alkyl; r and s each represents an integer from 1 to 20; and r+s ≤ 21.

21. A polymer as claimed in any one of claims 17 wherein the groups $S^5$ and $S^8$ are independently selected from a single bond, —($CH_2$)$_r$—, —O—($CH_2$)$_r$—, —CO—($CH_2$)$_r$—, —CO—O—($CH_2$)$_r$—, —O—CO—($CH_2$)$_r$—, —$NR^1$—CO—($CH_2$)$_r$—$NR^1$—($CH_2$)$_r$—, —CO—$NR^1$—($CH_2$)$_r$—, —$NR^1$—CO—($CH_2$)$_r$—, —($CH_2$)$_r$—O—($CH_2$)$_s$—, —($CH_2$)$_r$CO—O—($CH_2$)$_s$—, —($CH_2$)$_r$—O—CO—($CH_2$)$_s$—, —($CH_2$)$_r$—$NR^1$—CO—($CH_2$)$_s$—, —($CH_2$)$_r$—$NR^1$CO—O—($CH_2$)$_s$—, —O—($CH_2$)$_r$—O—($CH_2$)$_s$—, —O—($CH_2$)$_r$—CO—O—($CH_2$)$_s$—, —O—($CH_2$)$_r$—O—CO—($CH_2$)$_s$—, —O—($CH_2$)$_r$—$NR^1$—CO—($CH_2$)$_s$—, —O—($CH_2$)$_r$—$NR^1$—CO—O—($CH_2$)$_s$—, —O—CO—($CH_2$)$_r$—O—($CH_2$)$_s$— and —CO—O—($CH_2$)$_r$—O—($CH_2$)$_s$—, wherein $R^1$ represents a hydrogen atom or lower alkyl; r and s each represent an integer from 1 to 20: and r+s ≤ 21.

22. A polymer as claimed in any one of claims 17 wherein the groups $S^6$ and $S^7$ are independently selected from a single bond, —($CH_2$)$_r$—, —($CH_2$)$_r$—O—, —($CH_2$)$_r$—CO—, —($CH_2$)$_r$CO—O—, —($CH_2$)$_r$—O—CO—, —($CH_2$)$_r$—CO—$NR^1$—, —($CH_2$)$_r$—$NR^1$—CO—, —($CH_2$)$_r$—$NR^1$, —O—($CH_2$)$_r$—, —CO—O—($CH_2$)$_r$—, —O—CO—($CH_2$)$_r$—, —$NR^1$—CO—($CH_2$)$_r$—, —CO—$NR^1$—($CH_2$)$_r$—, —$NR^1$($CH_2$)$_r$—, —O—($CH_2$)$_r$—CO—O—, —O—($CH_2$)$_r$—O—CO—, —O—($CH_2$)$_r$—$NR^1$—, —O—($CH_2$)$_r$—O—, —O—($CH_2$)$_r$—$NR^1$—CO—, —$NR^1$—($CH_2$)$_r$—CO—O—, —NR$^1$—(CH$_2$)$_r$—O—, —NR$^1$—(CH$_2$)$_r$—NR$^1$—, —NR$^1$—(CH$_2$)$_r$—O—CO—, —CO—NR$^1$—(CH$_2$)$_r$—O—, —CO—NR$^1$—(CH$_2$)$_r$—NR$^1$—, —CO—NR$^1$—(CH$_2$)$_r$—O—CO—, —O—CO—(CH$_2$)$_r$—CO—, —O—CO—(CH$_2$)$_r$O—, —O—CO—(CH$_2$)$_r$—NR$^1$—, —O—CO—(CH$_2$)—CO—O—, —O—CO—(CH$_2$)$_r$—CO—NR$^1$—, —O—CO—(CH$_2$)$_r$—NR$^1$—CO—, —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$NR$^1$—CO—(CH$_2$)$_s$—, —(CH$_2$)$_r$—NR$^1$—CO—O—(CH$_2$)$_s$—, —(CH$_2$)$_r$—O—(CH$_2$)$_s$—O—, —(CH$_2$)$_r$—CO—O—CH$_2$)$_s$—O—, —(CH$_2$)$_r$—O—CO—(CH$_2$)$_s$—O—, —(CH$_2$)$_r$—NR$^1$—CO—(CH$_2$)$_s$—O—, —(CH$_2$)$_r$—NR$^1$—CO—O—(CH$_2$)$_s$—O—, —O—(CH$_2$)$_r$—O—(CH$_2$)$_s$—, —O—(CH$_2$)$_r$—CO—O—(CH$_2$)$_s$—, —O—(CH$_2$)$_r$—NR$^1$—CO—(CH$_2$)$_s$—, —O—(CH$_2$)$_r$—NR$^1$—CO—O—(CH$_2$)$_s$—, —O—(CH$_2$)$_r$—CO—O—(CH$_2$)$_s$—O—, —O—(CH$_2$)$_r$—O—(CH$_2$)$_s$—O—, —O—(CH$_2$)$_r$—NR$^1$—CO—(CH$_2$)$_s$—O—, —O—(CH$_2$)$_r$—NR$^1$—CO—O—(CH$_2$)$_s$—O—, —CO—O—(CH$_2$)$_r$—O—(CH$_2$)$_s$—, —CO—O—(CH$_2$)$_r$—O—(CH$_2$)$_s$ and —CO—O—(CH$_2$)$_r$—O—(CH$_2$)$_s$—O—, wherein R$^1$ represents a hydrogen atom or lower alkyl, r and s each represent an integer from 1 to 20; and r+s≦21.

23. A polymer as claimed in any preceding claim 1 having an intrinsic viscosity in the range of 0.05 to 10 dL/g, the intrinsic viscosity ($\eta_{inh}$=ln $\eta_{rel}$/C) being determined by measuring a solution containing a polymer in a concentration of 0.5 g/100 ml for its viscosity at 30° C. using N-methyl-2-pyrrolidone as solvent.

24. A polymer as claimed in claim 1 containing from 2 to 2000 monomer units.

25. A composition comprising a polymer as claimed in claim 1 and a silane-containing compound, an epoxy—containing crosslinking agent, a photosensitiser, a photo-radical generator and/or a cationic photoinitiator.

26. A polymer layer comprising a polymer as claimed in claim 1 in a crosslinked form.

27. A process for preparing a polymer layer as claimed in claim 26 comprising applying one or more polymers as claimed in claim 1 to a support and, after any optional imidization step, crosslinking the one or more polymers by irradiation with linearly polarized light.

28. An orientation layer for liquid crystals comprising one or more polymers as claimed in claim 1 in a crosslinked form.

29. An optical contructional element comprising an orientation layer as claimed in claim 28.

30. An optical or electro-optical device comprising one or more polymers as claimed in claim 1 in crosslinked form.

31. A method for orienting liquid crystal molecules, which comprises orienting the molecules with an orientation layer as claimed in claim 28.

32. An unstructured and/or structured optical clement comprising one or more polymers as claimed in claim 1 in crosslinked form.

33. A multi-layer system comprising one or more polymers as claimed in claim 1 in crosslinked form.

\* \* \* \* \*

UNITED STATES PATENT AND TRADEMARK OFFICE
CERTIFICATE OF CORRECTION

PATENT NO. : 6,831,148 B2
DATED : December 14, 2004
INVENTOR(S) : Richard Buchecker et al.

It is certified that error appears in the above-identified patent and that said Letters Patent is hereby corrected as shown below:

Column 22,
Line 15, delete "is" after -- $C_{1\text{-}18}$ --.

Column 23,
Line 13, "CH≡CH" should read -- CH=CH --.
Line 31, delete "CH≡CH" and insert -- C≡C -- therefor.

Column 24,
Lines 62, 64 and 66, delete "any preceding claim" and insert -- claim 1 -- therefor.
Line 67, delete "from which" and insert -- of -- therefor.

Column 25,
Line 52, "symbolises" should read -- symbolizes --.

Column 26,
Line 25, delete "any one of".

Column 27,
Line 6, "$(CH_2)$" should read -- $(CH_2)_r$ --.
Line 24, delete "any preceding".

Signed and Sealed this

Nineteenth Day of July, 2005

JON W. DUDAS
*Director of the United States Patent and Trademark Office*